United States Patent [19]

Hashimoto et al.

[11] 4,330,209
[45] * May 18, 1982

[54] SPECTROPHOTOMETER RECEIVING A VARIABLE QUANTITY OF LIGHT

[75] Inventors: Noriyoshi Hashimoto, Chofu; Mikio Ito; Kikuo Tamura, both of Yokohama, all of Japan

[73] Assignee: Nippon Kogaku K.K., Tokyo, Japan

[*] Notice: The portion of the term of this patent subsequent to Mar. 23, 1999, has been disclaimed.

[21] Appl. No.: 69,924

[22] Filed: Aug. 27, 1979

[30] Foreign Application Priority Data

Aug. 28, 1978 [JP] Japan ............................. 53/103786
Aug. 28, 1978 [JP] Japan ............................. 53/103787

[51] Int. Cl.³ .............................................. G01J 3/38
[52] U.S. Cl. .................................. 356/328; 356/308
[58] Field of Search ............... 364/498, 526; 356/308, 356/309, 319, 320, 323–326, 328, 332, 334

[56] References Cited

U.S. PATENT DOCUMENTS 3,695,764  10/1972  Delmas et al. ............... 356/334 X
3,874,799   4/1975  Isaacs et al. ................ 356/323 X

OTHER PUBLICATIONS

Durham III et al., IBM Technical Disclosure Bulletin, vol. 19, No. 6, Nov. 1976, pp. 2182–2184.
Horlick, "Characteristics of Photodiode Arrays for Spectrochemical Measurements", *Applied Spectroscopy*, vol. 30, No. 2, Mar./Apr. 1976, pp. 113–123.

*Primary Examiner*—F. L. Evans
*Attorney, Agent, or Firm*—Fitzpatrick, Cella, Harper & Scinto

[57] ABSTRACT

This specification discloses a spectrophotometer utilizing, as the photoelectrical converting element, an image sensor capable of electrical scanning such as a photodiode array, thus adjusting the integration time thereof, namely, the scanning time of the image sensor and enhancing the S/N (signal-to-noise ratio).

8 Claims, 8 Drawing Figures

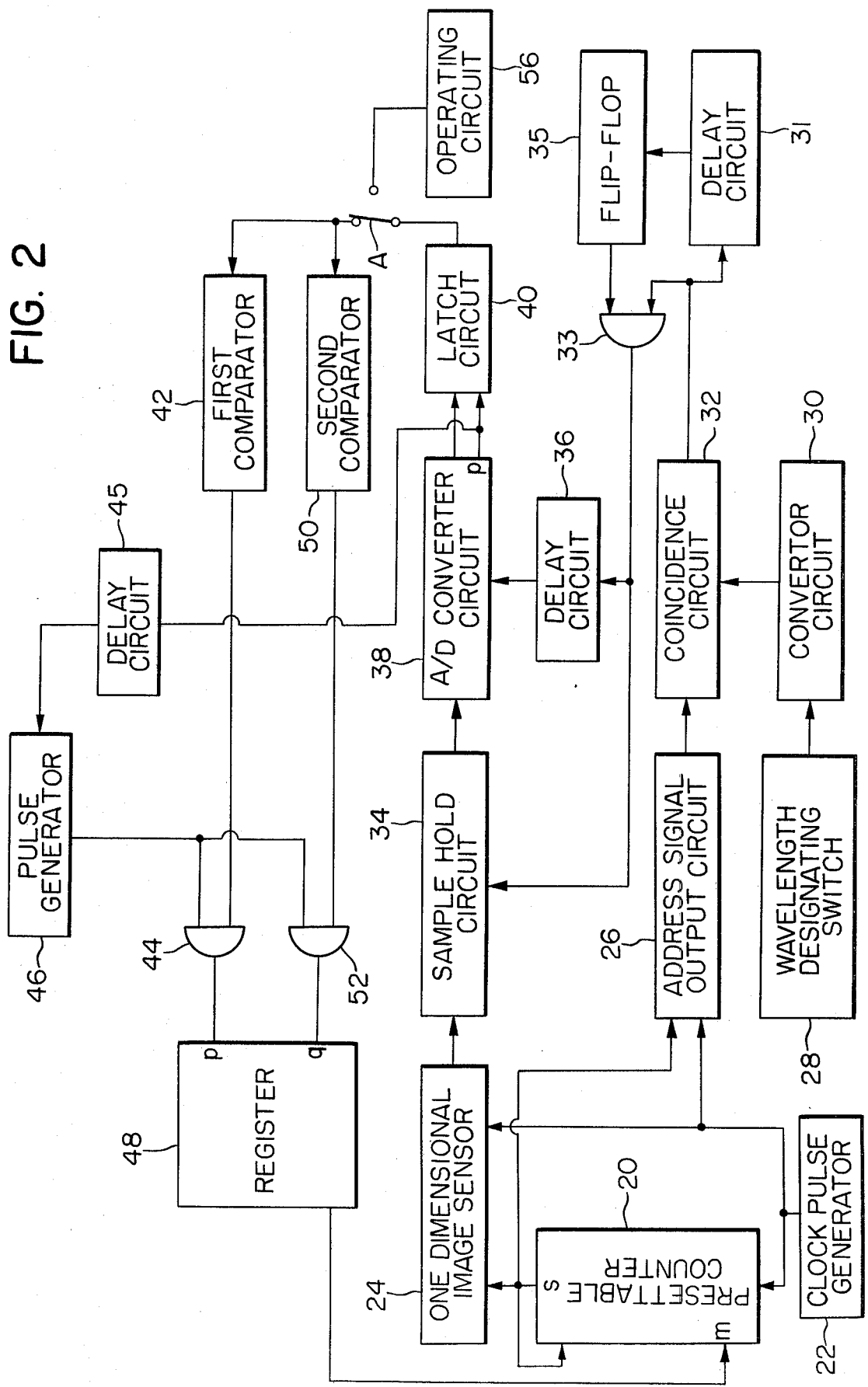

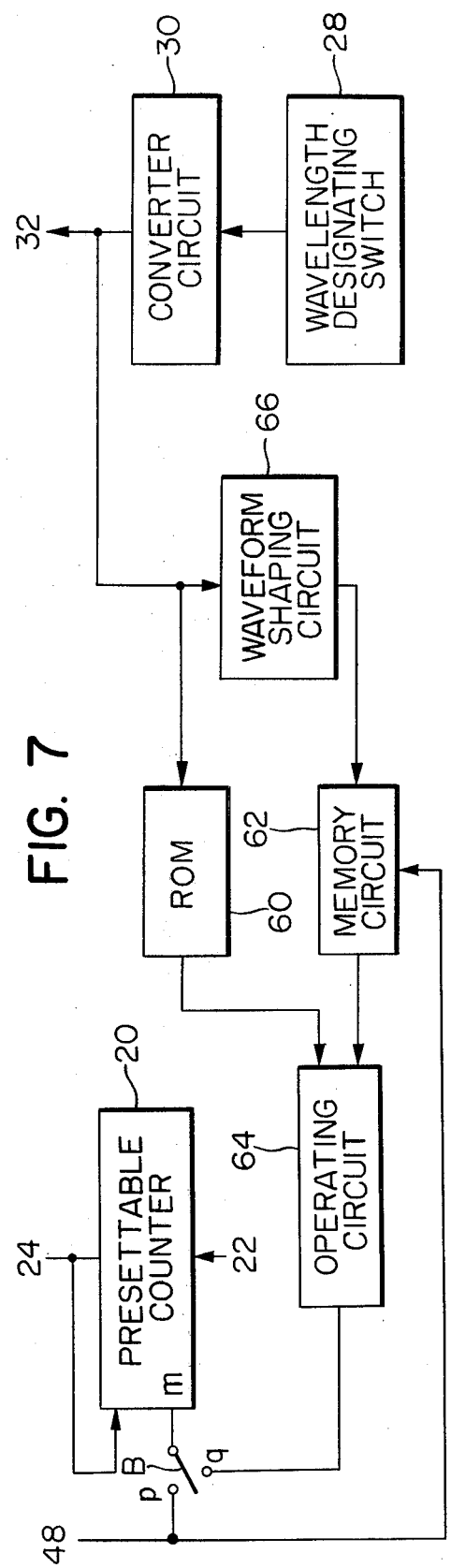

4,330,209

SPECTROPHOTOMETER RECEIVING A VARIABLE QUANTITY OF LIGHT

BACKGROUND OF THE INVENTION

1. Field of the Invention

This invention relates to a spectrophotometer.

2. Description of the Prior Art

There are already known spectrophotometers in which, for photoelectrical detection of the light of a desired wavelength out of spectrum, mechanical scanning is made with a diffracting element or a photoelectrical converting element, thus achieving spectral measurement by the correspondence between the spatial position of said element and the wavelength.

However, such mechanical scanning with the diffracting element or the photoelectrical converting element is not satisfactory in consideration of the scanning speed or the reliability.

SUMMARY OF THE INVENTION

An object of the present invention is to provide a spectrophotometer with improved measuring speed and reliability.

Particularly, an object of the present invention is to provide a spectrophotometer utilizing, as the photoelectrical converting element, an image sensor capable of electrical scanning such as a photo-diode array, thus adjusting the integration time thereof, namely, the scanning time of the image sensor and enhancing the S/N (signal-to-noise ratio).

The invention will become fully apparent from the following detailed description thereof taken in conjunction with the accompanying drawings.

BRIEF DESCRIPTION OF THE DRAWINGS

FIG. 2 illustrates the electrical processing system of the spectrophotometer according to the present invention.

FIGS. 4(A–J) shows the output waveforms in the electrical processing system of FIG. 2.

FIG. 7 shows another construction performing a function similar to that of FIG. 6.

DESCRIPTION OF THE PREFERRED EMBODIMENTS

Figure 1:
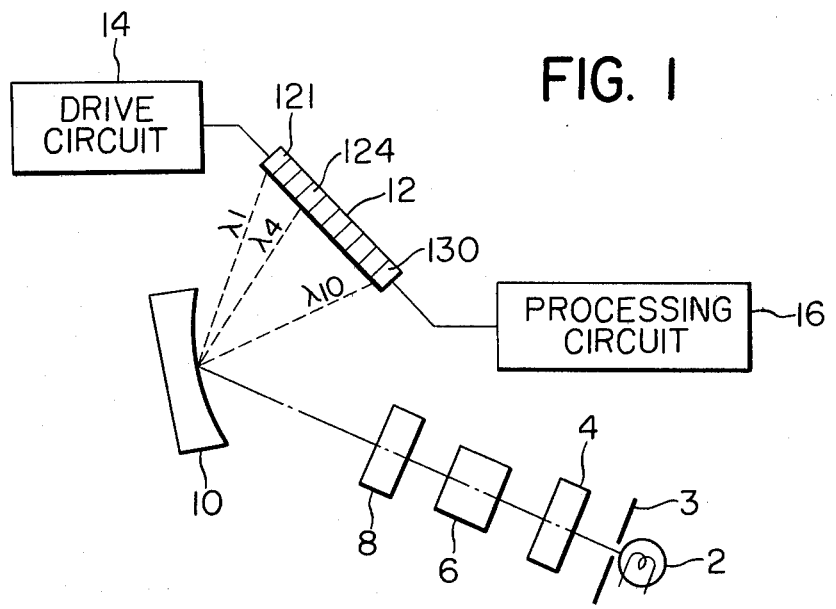
FIG. 1 shows the optical arrangement of the spectrophotometer using an image sensor.

In FIG. 1 schematically showing an embodiment of the optical system to be employed in the spectrometer of the present invention, a light beam emitted by a light source 2 passes through a variable diaphragm 3 and is collimated by a first optical system 4, then passes through a sample in a cell 6 and a second optical system 8, and is diffracted by a diffracting element 10 such as a concave diffraction grating and focused on a one-dimensional image sensor 12. In this arrangement, the beam of a particular wavelength diffracted by the diffracting element 10 is always focused to a particular position on said one-dimensional image sensor 12. For example, the photoelectric converting elements 121, 124 and 130 respectively correspond to wavelengths λ1, λ4 and λ10. Said one-dimensional image sensor 12 is composed of a semiconductor photoelectrical converting element such as a MOS photodiode array and is structured to release the photoelectrically converted signals time sequentially from the photoelectric converting element at one end 121 to the other 130 in synchronization with clock pulses supplied from a drive circuit 14. As is well-known, each signal put out time sequentially is a charge discharged in accordance with the quantity of light received by each photoelectrical converting element within a predetermined integration time. The output signals from said one-dimensional image sensor 12 are sequentially received by a processing circuit 16 and suitably treated therein.

FIG. 2 is a block diagram showing an embodiment of the present invention. The circuit of FIG. 2 is one which can enhance the photoelectrical conversion characteristic of the entire system as indicated by curve (b) in FIG. 3 by setting the photoelectrical conversion output of the maximum wavelength $\lambda_0$ of the spectral sensitivity to a maximum value $I_0$ in the output characteristic of the photoelectrical converting element for each wavelength as indicated by curve (a) in FIG. 3 (hereinafter referred to as the photoelectrical conversion characteristic and this is determined by the spectral sensitivity characteristics of the light source 2, optical systems 4, 8 and one-dimensional image sensor 12) and thereby enhance the S/N of the device.

In FIG. 2, a presettable counter 20 counts the clock pulses put out by a clock pulse generator 22 with the preset value applied to the terminal m as the count starting point and when it counts up, it puts out a carry signal to the output terminal s. The carry signal is utilized as the preset pulse for the counter 20. A one-dimensional image sensor 24 performs a scanning function by the clock pulses from the clock pulse generator 22. In this manner, the one-dimensional image sensor 24 produces time sequential electrical signals corresponding to the amounts of light received by the photoelectric converting elements. An address signal output circuit 26 comprises a counter which counts the clock pulses applied from the clock pulse generator 22 after said carry signal has been put out and puts out the count value. Therefore, the count value of the clock pulses by the address signal output circuit 26 is a value corresponding to the address of the photoelectrical converting element of the one-dimensional image sensor 24 which is being driven. A wavelength designating switch 28 comprises a digital switch or a snap switch and can designate any desired wavelength. Converting means 30 converts the output of the wavelength designating switch 28 into a value corresponding to the address of the photoelectrical converting element so that the output of the wavelength designating switch 28 and the content of the address signal output circuit 26 can be compared with each other in a coincidence circuit 32. As briefly described in connection with FIG. 1, the light of a particular wavelength incident on the one-dimensional image sensor 24 is focused on a particular photoelectrical converting element of the one-dimensional image sensor and therefore, the converting means can be simply composed of a ROM, for example, by making the wavelength and the address correspond to each other. The coincidence circuit 32 compares the output of the address signal output circuit 26 with the output of the converting circuit and puts out a coincidence signal when the two outputs are coincident. The coincidence signal put out by the coincidence circuit 32 is applied to one input terminal of an AND gate 33 and also to a flip-flop 35 after delayed by a delay circuit 31. The flip-flop 35 inverts its output condition each time it receives the coincidence signal from the delay circuit 31, and effects the so-called toggle operation. Since the output of the flip-flop 35 is applied to the other input terminal of the AND gate 33, the output of the AND gate 33 puts out every other coincidence signal of the coincidence circuit 32. A sample hold circuit 34 holds the output signal of the image sensor 24 when the coincidence signal put out by the AND gate 33 is applied. A delay circuit 36 is one for delaying the coincidence signal applied to an A/D converter circuit 38 until the output of the sample hold circuit 34 is settled to a predetermined value. By an A/D conversion start signal synchronized with the coincidence signal put out by the delay circuit 36, the A/D converter circuit 38 starts the A/D conversion of the output of the sample hold circuit 34. Upon completion of the conversion, the A/D converter circuit 38 puts out an A/D conversion completion signal to the terminal p. A latch circuit 40, when receiving the conversion completion signal, stores therein the A/D conversion output of the A/D converter circuit 38. A first comparator 42 compares the stored content of the latch circuit 40 with the upper limit of the photoelectrical conversion output for the proper quantity of light received by the one-dimensional image sensor 24 (for example, 90% of the saturation output) and when the former is over the latter, it puts out logic 1 signal as an over signal. A first AND circuit 44, when the first comparator 42 puts out the logic 1 signal, applies the clock pulses generated by the pulse generator 46 to the increment input terminal p of a register 48. At this time, the clock pulses from the pulse generator 46 are generated by a signal resulting from delaying the A/D conversion completion signal by the delay circuit 45 so that the clock pulses are put out from the pulse generator 46 after the output of the first comparator 42 has become stable. A second comparator 50 compares the stored content of the latch circuit 40 with the lower limit of the photoelectrical conversion output for the proper quantity of light received by the one-dimensional image sensor (for example, 80% of the saturation output) and when the former is under the latter, it puts out logic 1 signal as an under signal. A second AND circuit 52, when the second comparator puts out logic 1 signal, applies the clock pulses generated by the pulse generator 46 to the decrement input terminal q of the register 48. The register 48 increases its own content when the clock pulses are applied to the increment input terminal p thereof, and decreases its own content when the clock pulses are applied to the decrement input terminal q thereof. The count of the register 48 is applied to the terminal m of the presettable counter 20 as a preset value.

The operation of the circuit shown in FIG. 2 will now be described by reference to the timing chart of FIG. 4. First, when an unshown operating switch of the spectrophotometer is closed, pure water with standard transmittivity of 100% is introduced into the cell 6 shown in FIG. 1 by an unshown mechanism and the circuit of FIG. 2 becomes operative. Here, the maximum wavelength $\lambda_0$ of the spectral sensitivity is designated by the wavelength designating switch 28. After the operating switch has been closed, the one-dimensional image sensor 24 is scanned by the clock pulses (FIG. 4(a)) from the clock pulse generator subsequent to the carry signal (FIG. 4(b)) of the presettable counter 20, and puts out time sequential photoelectrical conversion signals corresponding to the amounts of light incident on the photoelectrical converting elements (FIG. 4(c)). The one-stage signal from the coincidence circuit 32 is produced when the element which has received the wavelength $\lambda_1$ in a predetermined time $t_1$ after the carry signal shown in FIG. 4(b) is driven (FIG. 4(d)). The flip-flop 35 inverts its output condition in a predetermined time $t_2$ after the coincidence signal shown in FIG. 4(d), said time $t_2$ being determined by the delay circuit 31 (FIG. 4(e)). As the result, the output of the AND gate taking the AND of the FIG. 4(d) signal and the FIG. 4(e) signal puts out every other coincidence signal from the coincidence circuit 32 (FIG. 4(f)). The sample hold circuit 34 holds the photoelectrical conversion signal when the output of the AND gate 33 is produced (FIG. 4(g)). The A/D converter circuit 38 A/D converts the sample hold signal of the sample hold circuit 34 by an A/D start signal (FIG. 4(h)) resulting from delaying the output of the AND gate 33 by the delay circuit 36 (FIG. 4(i)). The A/D-converted signal is stored in the latch circuit 40 by an A/D conversion completion signal (FIG. 4(j)).

Figure 5:
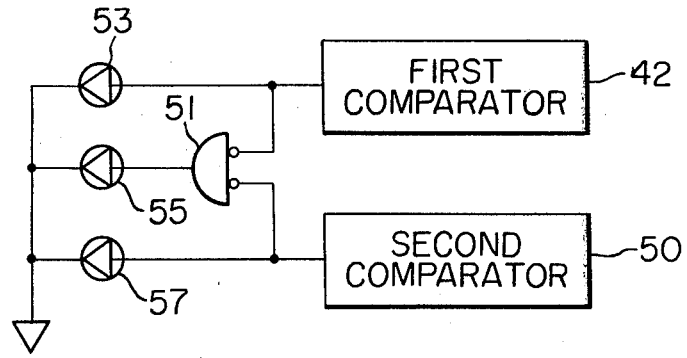
FIG. 5 shows the construction of an alarm circuit added to the circuit of FIG. 2.

The first and second comparators 42 and 50 control the register 48 on the basis of the stored content of the latch circuit 40. As the result, the preset value of the presettable counter 20 is designated so that the quantity of the light of the maximum wavelength $\lambda_0$ of the spectral sensitivity incident on the one-dimensional image sensor becomes a proper quantity of light. Assume that the one-dimensional image sensor 24 comprises n photoelectrical converting elements (in the timing chart of FIG. 4, the case of ten such elements is taken as an example as will be seen from FIG. 4(c) and that the presettable counter 20 selected is of the preset value 0 (zero) and module m. If the preset value is designated to l, the integration time of the one-dimensional image sensor 24 is x (m−l), where x is the period of the clock pulse and (m−l)−n clock pulses are discarded as idle pulses until the start pulse is produce to start scanning after the photoelectrical converting elements have been subjected to one scanning. If the preset value is varied in this manner, the integration time becomes stable when the quantity of light incident on the photoelectrical converting element which receives the light of the maximum wavelength $\lambda_0$ of the spectral sensitivity becomes an effective maximum value. To know such stabilization time, a preparatory time may be adopted in advance before the measurement is effected, but alternatively the alarm circuit as shown in FIG. 5 may be added. Referring to FIG. 5, the output terminal of the first comparator 42 is connected to the anode of an over display light-emitting diode 53 and one input terminal of an AND gate 51 having two inverting input terminals, the output terminal of the second comparator 50 is connected to the anode of an under display light-emitting diode 56 and the other input terminal of the AND gate 51, and the output terminal of the AND gate 51 is connected to the anode of a properness display light-emitting diode 55. The cathode of each light-emitting diode is grounded. Therefore, when a high level signal is put out as logic 1 from the first comparator 42, the light-emitting diode 53 is turned on and when a high level signal is put out as logic 1 from the second comparator 50, the light-emitting diode 57 is turned on.

During the other time, the light-emitting diode 55 is turned on to display over, under or properness. The measurer may start measurement after having confirmed the turn-on of the light-emitting diode 55.

After having confirmed that the preset value of the presettable counter 20 has become stable and the light-emitting diode 55 has been turned on, the measurer may change over the switch A of FIG. 2 to connect the output terminal of the latch circuit 40 to an operation display circuit 56, whereby measurement may be effected for the same integration time as that obtained above for each wavelength designated by the wavelength designating switch 28. In the foregoing, it has been described that the above-mentioned setting can be set by controlling only the integration time of the one-dimensional image sensor so that the quantity of light received by the photoelectrical converting element which receives the light of the maximum wavelength $\lambda_0$ of the spectral sensitivity becomes an effective maximum value, but actually the intensity of the light source is too great and the photoelectrical conversion output in the wavelength $\lambda_0$ may sometimes be saturated even if the integration time is set to one scanning time of the one-dimensional image sensor which is the shortest integration time. In such a case, the opening of the diaphragm 3 placed before the light source 2 as shown in FIG. 1 may be adjusted to decrease the intensity of light incident on the one-dimensional image sensor 12.

Figure 6:
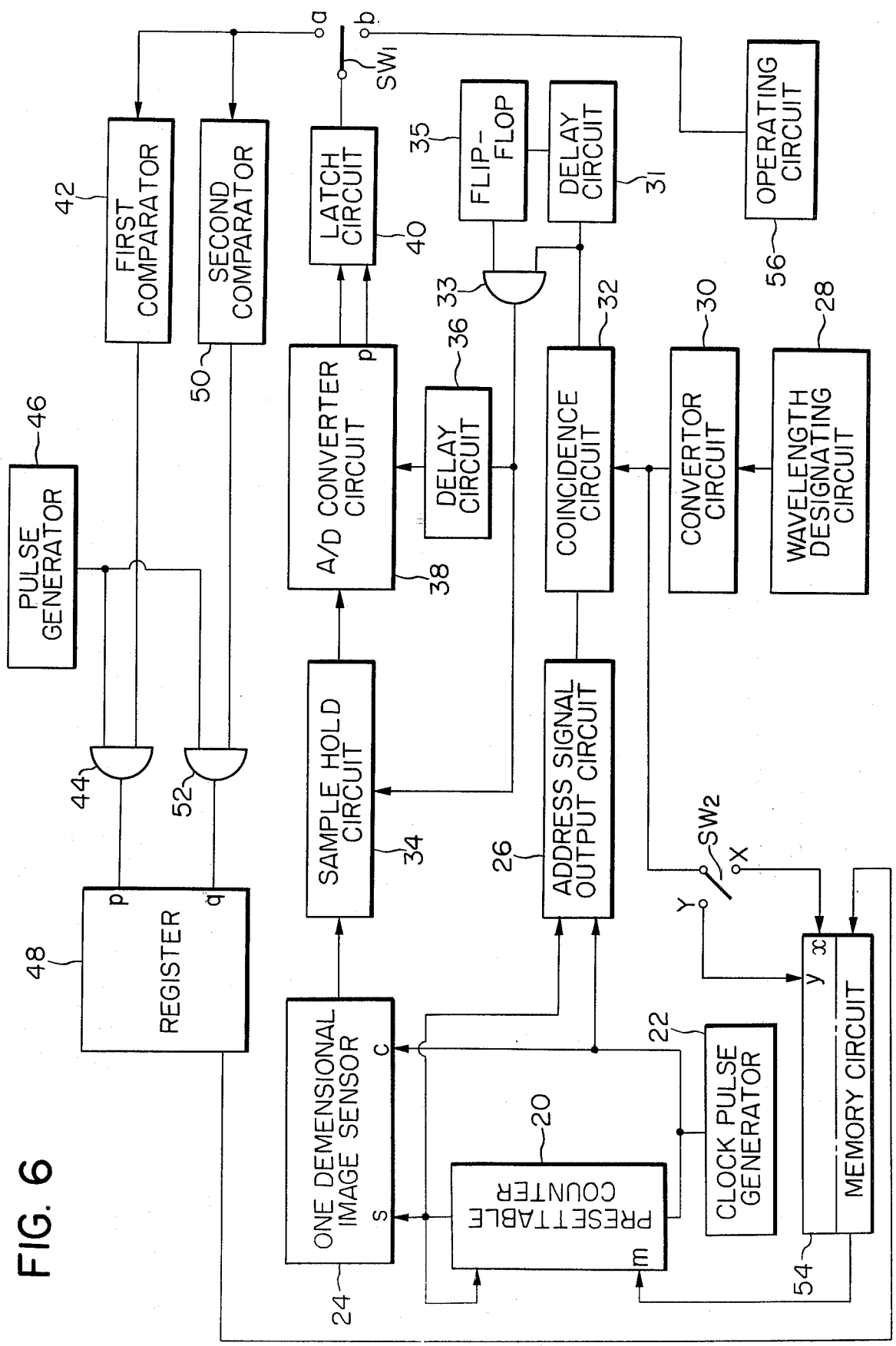
FIG. 6 shows a construction improved over the electrical processing system of FIG. 2.

In the above-described embodiment, the intergration time of the one-dimensional image sensor is set so that the quantity of light received by the photoelectrical converting element which receives the light of the maximum wavelength $\lambda_0$ of the spectral sensitivity becomes an effective maximum value, whereby the quantity of light received in the other wavelengths is also enhanced as already described in connection with FIG. 3. On the other hand, where the wavelength to be measured is only a particular wavelength, the circuit of FIG. 2 may also be used with the integration time set so that the quantity of light received by the photoelectrical converting element for that wavelength becomes an effective maximum value. This is because, if a wavelength is designated by the wavelength designating switch 28 of FIG. 2, the circuit operates just in the same manner as when the spectral sensitivity $\lambda_0$ is designated. However, the measurement using a spectrophotometer is usually carried out by the use of several wavelengths. Therefore, in order to enhance the S/N as a spectrophotometer, it is more desirable to set the integration time so that the amount of quantity received by the photoelectrical converting elements for all the measurable wavelengths become an effective maximum value as shown in FIG. 3C. In such a case, however, it is cumbersome to set the integration time for each measurement of the wavelengths. An embodiment which eliminates such cumbersomeness will now be described by reference to FIG. 6. In FIG. 6, the elements identical to those in FIG. 2 are given similar reference numerals and need not be described. The content of the register 48 is not directly applied to the presettable counter 20 but is stored in a memory circuit 54 capable of writing in and reading out and is suitably read out to control the preset value of the presettable counter 20. The writing-in and reading-out of the memory circuit 54 is effected in synchronism with the wavelength designated by the wavelength designating switch 28 (as the output of the converting circuit 30, the address of the photoelectrical converting element corresponding to the designated wavelength).

An operating circuit 56 is one for operating the stored content of the latch circuit 40 in a desired form. First, a first switch $SW_1$ is connected to the terminal a and a second switch $SW_2$ connected to the terminal x, and an unshown operating switch of the spectrophotometer is closed to introduce a standard substance of transmittivity of 100% into the cell 6 shown in FIG. 1 by an unshown mechanism and at the same time designate the wavelength designating switch 28 sequentially from the minimum wavelength to the maximum wavelength. Thereupon, in the memory circuit 54, the address of the photoelectrical coverting element corresponding to each designated wavelength and the preset value of the presettable counter 20 are stored in the form of a pair. When the designation of all the wavelengths by the wavelength designating switch 28 is completed, the first switch $SW_1$ is changed over to the terminal b and the second switch $SW_2$ is changed over to the terminal Y. When any desired wavelength $\lambda_1$ is designated by the wavelength designating switch 28, the address of the photoelectrical converting element corresponding to this wavelength is applied to the address designating input terminal y of the memory circuit 54 through the terminal Y. As the result, a preset value corresponding to the designated wavelength is put out by the memory circuit 54 and applied to the terminal m of the presettable counter 20. At this time, the output of the latch circuit 40 corresponding to the light of the wavelength $\lambda_1$ passed through the standard substance of transmittivity of 100% is applied as a reference signal to the operating circuit 56. Next, a sample is introduced into the cell 6 of FIG. 1 by an unshown mechanism and when the wavelength $\lambda_1$ is designated by the wavelength designating switch, the output of the latch circuit corresponding to the quantity of the light of the wavelength $\lambda_1$ after having passed through the sample is applied as a measurement signal to the operating circuit 56. The operating circuit 56 effects the operation for obtaining the light absorption degree of the sample from the reference signal and the measurement signal and displays the result.

Figure 3:
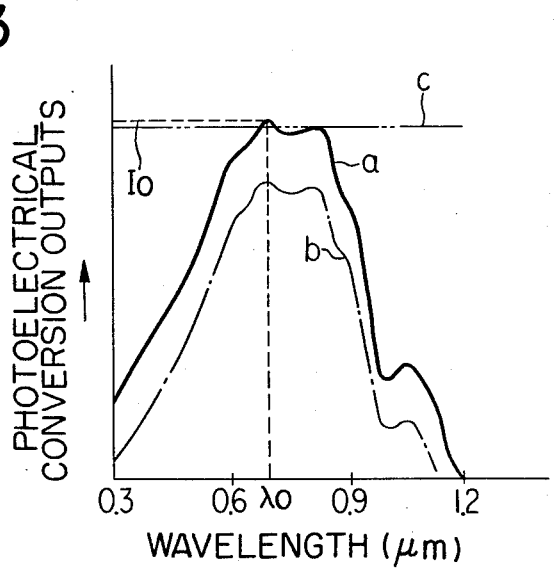
FIG. 3 shows the output characteristic of the photoelectrical converting element for wavelength.

In the embodiment of FIG. 6, design is made such that the preset value corresponding to each wavelength is obtained and stored in the memory circuit 54 before the measurement of the sample is effected and that the preset value is read out in synchronism with the wavelength designation, whereas the photoelectric conversion characteristic as shown by the curve (a) in FIG. 3 can be measured at the point of time whereat the device has been made up and moreover, it is considered that the ratio of the photoelectrical conversion outputs between the wavelengths is not varied and therefore, if the ratio ($I_1/I_\lambda$ or $I_\lambda/I_1$) of the photoelectrical conversion output $I_\lambda$ of the other wavelength $\lambda$ to the photoelectrical conversion output $I_1$ of the standard wavelength $\lambda_1$ is obtained in advance and stored in the memory circuit, it is possible to render the photoelectrical conversion outputs of all the wavelengths identical or nearly identical as indicated at (c) in FIG. 3 by obtaining only the optimal integration time $T_1$ of the standard wavelength. Description will now be made by reference to FIG. 7. In FIG. 7, the elements identical to those in FIG. 2 are given similar reference numerals. ROM 60 stores therein the aforementioned ratio ($I_1/I_\lambda$ or $I_\lambda/I_1$) corresponding to the other wavelength $\lambda$ and when a certain wavelength $\lambda'$ is designated, the aforementioned ratio ($I_1/I_{\lambda'}$ or $I_{\lambda'}/I_1$) is read out therefrom. Initially, a switch B is connected to the terminal p and the preset value of the presettable counter 20 (which corresponds to the intergration time of the standard wavelength $\lambda_1$) corresponding to the standard wavelength $\lambda_1$ is controlled by a circuit entirely similar to the circuit of FIG. 2 in accordance with the count content of the register 48 of FIG. 2 and therefore, this count content $T_1$ is stored in a memory circuit 62. Thereafter, the switch A shown in FIG. 2 is changed over to an unshown operating circuit and also the switch B is connected to the terminal q, whereafter when a certain wavelength $\lambda$ is designated by the wavelength designating switch 28, the aforementioned ratio ($I_1/I_{\lambda'}$ or $I_{\lambda'}/I_1$) corresponding to the designated wavelength $\lambda'$ is applied to one input terminal of an operating circuit (multiplying or dividing circuit) 64 by the output of the converter circuit 30. The content of the memory circuit 62 is read out by the output of the converter circuit 30 passed through a waveform shaping circuit 66, and is applied to the other input terminal of the operating circuit 64. The operating circuit 64 operates $$\frac{T_1 I_1}{I_{\lambda'}}$$

between its two inputs and puts out the same. The output of the operating circuit 64 is applied to the terminal m of the presettable counter 20 as a preset value which provides the effective maximum value of the quantity of light incident on the photoelectrical converting element which receives the light of the designated wavelength $\lambda'$.

Figure 8:
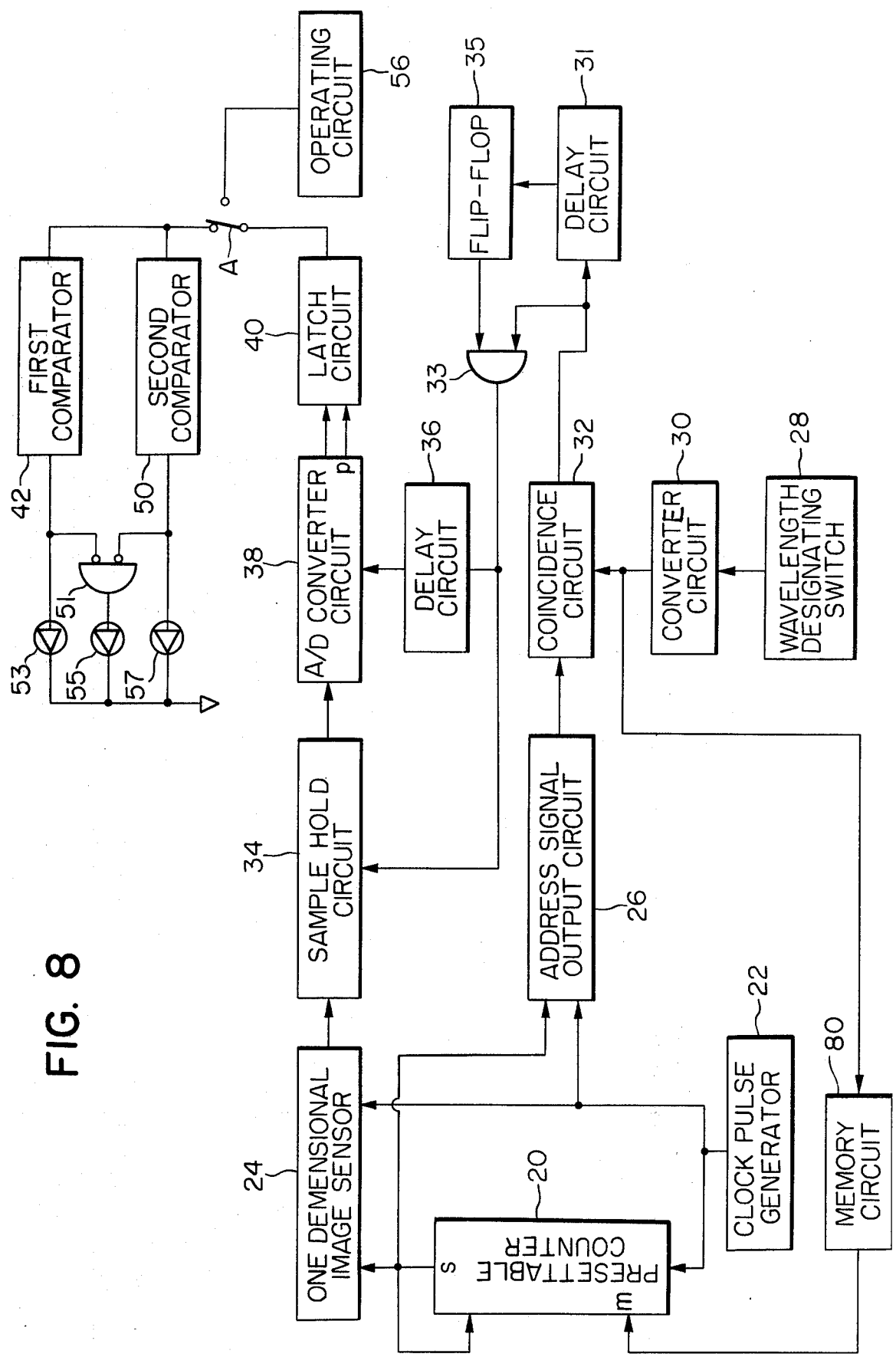
FIG. 8 shows another embodiment of the present invention.

The embodiments of FIGS. 2, 6 and 7 are ones having a circuit for obtaining an optimal integration time, but generally, at the point of time whereat the device is completed, the spectral sensitivity characteristic intrinsic to the device is determined and therefore, as shown in FIG. 8, design can be made such that an integration time corresponding to each wavelength, namely, the preset value of the presettable counter 20, is pre-stored in a memory circuit 80. In this case, the device may be simplified if design is made such that the preset value corresponding to the designated wavelength is read out from the memory circuit 80 with the output of the converter means 30 as the address designating signal of the memory circuit 80, thereby setting the preset value of the presettable counter 20. The other blocks of FIG. 8 are identical to those described in connection with FIGS. 2 and 3 (the identical blocks are given identical reference numerals) and need not be described. When the light-emitting diodes 53 and 57 are turned on, a quantity-of-light varying means such as the variable diaphragm 3 disposed in the optical system of the spectrophotometer may be operated to make adjustment so that the light-emitting diode 55 is turned on. In this case, the quantity-of-light varying means may be an element such as liquid crystal or electrochromic element whose transmittivity is variable in accordance with the magnitude of the voltage applied.

According to the present invention, as has been described above, there can be provided a spectrophotometer using an image sensor in the light receiving portion and having a high S/N (signal-to-noise ratio). Also, an alarm is given when the quantity of light incident on the image sensor has become a proper value and this enables the measurement starting time point to be known exactly, thus enhancing the operability.

We claim:

1. A spectrophotometer provided with a light diffracting element for obtaining diffracted light, comprising:
    image sensor means adapted for receiving said diffracted light and provided with photoelectric converting elements respectively corresponding to different wavelengths of said diffracted light, each of said photoelectric converting elements storing a charge corresponding to the quantity of light received by it within a predetermined integration time and discharging said charge as photoelectric conversion signals by the driving thereof;
    drive means for sequentially driving said photoelectric converting elements of said image sensor means, said drive means being capable of varying said integration time;
    wavelength designating means having a wavelength designating portion which can designate an arbitrary wavelength externally, the wavelength designating means putting out a wavelength signal corresponding to the designated wavelength;
    address signal output means for putting out respective address signals in synchronism with the driving of the photoelectric converting elements of said image sensor;
    coincidence signal output means for receiving and comparing said wavelength signal and said address signal and for putting out a coincidence signal when said wavelength signal and said address signal correspond to each other;
    gate means for receiving electrical signals time-sequentially put out by said image sensor and putting out said electrical signal synchronized with said coincidence signal; and
    operating means for applying an appropriate operating process to the photoelectric conversion signal put out by said gate means.

2. A spectrophotometer provided with a light diffracting element for obtaining diffracted light, comprising:
    image sensor means adapted for receiving said diffracted light and provided with photoelectric converting elements storing a charge corresponding to the quantity of light received by it within a predetermined integration time and discharging said charge by the driving thereof;
    drive means for sequentially driving said photoelectric converting elements of said image sensor means, said drive means being capable of varying said integration time;
    wavelength designating means capable of designating any desired wavelength;
    selecting means for selecting a photoelectric conversion signal corresponding to the wavelength designated by said wavelength designating means from among the photoelectric conversion signals sequentially put out by said image sensor means and for putting out the same; and
    operating means for applying an appropriate operating process to the photoelectric conversion signal put out by said selecting means;
    said drive means including a detector for detecting, during the measurement of a standard sample, whether or not the level of the photoelectric conversion signal put out by said selecting means is within a predetermined range;
    an integration time adjusting device for adjusting said integration time by the signal from said detector, when said level departs from said range, so that said level may be within said range; and a driver for driving said photoelectric converting elements on the basis of the integration time adjusted by said adjusting device.

3. A spectrophotometer according to claim 2, wherein said driver includes:
a memory circuit for storing the integration time of said integration time adjusting device obtained by designating a maximum wavelength of the spectral sensitivity of said spectrophotometer by said wavelength designating means during the measurement of the standard sample; and
a driving circuit for driving said photoelectric converting elements on the basis of the integration time stored in said memory circuit.

4. A spectrophotometer according to claim 2, wherein said driver includes:
a memory circuit for sequentially storing the integration time of said integration time adjusting device obtained by sequentially designating all wavelengths necessary for measurement by said wavelength designating means during the measurement of the standard sample, in correspondence to the wavelengths; and
a driving circuit for calling out, from said memory circuit, the integration time corresponding to the wavelength designated for measurement by said wavelength designating means and for driving said photoelectric converting elements on the basis of the called-out value.

5. A spectrophotometer according to claim 2, wherein said driver includes:
a memory circuit for storing the integration time ($T_1$) of said integration time adjusting device obtained by designating a maximum wavelength of the spectral sensitivity of said spectrophotometer by said wavelength designating means during the measurement of the standard sample;
a ROM for storing the ratio of the photoelectric conversion signal ($I_1$) of the maximum wavelength of the spectral sensitivity to the photoelectric conversion signal ($I_\lambda$) of any other wavelength ($I_0/I_\lambda$ or $I_\lambda/I_0$) in correspondence to each wavelength ($\lambda$), the read-out of said ratio from said ROM being effected with the wavelength designation by said wavelength designating means;
an operating circuit for effecting an operation $$\left(\frac{T_0 \cdot I_0}{I_\lambda}\right)$$

between said ratio read out from said ROM with the wavelength designation by said wavelength designating means and the stored content of said memory circuit and for putting out the result of the operation, the output of said operating circuit being an integration time most appropriate for the wavelength ($\lambda$); and
a driving circuit for driving said photoelectric converting elements on the basis of the output of said operating circuit.

6. A spectrophotometer according to claim 2, wherein said detector has an alarm means for giving an alarm when the level of the photoelectric conversion signal put out by said selecting means is within a predetermined range.

7. A spectrophotometer provided with a light diffracting element for obtaining diffracted light, comprising:
image sensor means adapted for receiving said diffracted light and provided with photoelectric converting elements respectively corresponding to different wavelengths of said diffracted light, each of said photoelectric converting elements storing a charge corresponding to the quantity of light received by it within a predetermined integration time and discharging said charge by the driving thereof;
drive means for sequentially driving said photoelectric converting elements of said image sensor means, said drive means being capable of varying said integration time;
wavelength designating means capable of designating any desired wavelength;
selecting means for selecting a photoelectric conversion signal corresponding to the wavelength designated by said wavelength designating means from among the photoelectric conversion signals sequentially put out by said image sensor means and for putting out the same; and
operating means for applying an appropriate operating process to the photoelectric conversion signal put out by said selecting means;
said drive means including a memory device for storing said integration time for each wavelength; and
a driver for calling out, from said memory device, the integration time corresponding to the wavelength designated for measurement by said wavelength designating means and for driving said photoelectric converting elements of said image sensor on the basis of the called-out integration time.

8. A spectrophotometer according to claim 7, further comprising:
alarm means for giving an alarm when the level of the photoelectric conversion signal put out by said selecting means during the measurement of a standard sample is within a predetermined range; and
quantity-of-light adjusting means disposed in the optical system of said spectrophotometer.

* * * * *